United States Patent [19]

Manuel

[11] Patent Number: 4,742,911
[45] Date of Patent: May 10, 1988

[54] GROCERY LIST DEVICE

[76] Inventor: Roosevelt R. Manuel, Rte. 4, Graham Rd., Gray, Ga. 31032

[21] Appl. No.: 30,701

[22] Filed: Mar. 26, 1987

[51] Int. Cl.⁴ .......................................... B65D 85/00
[52] U.S. Cl. .................................. 206/425; 206/232; 206/831; 206/459
[58] Field of Search ............... 206/232, 459, 216, 831, 206/425, 214

[56] References Cited

U.S. PATENT DOCUMENTS 4,255,872  3/1981  Williams, Sr. ................ 206/232 X
4,260,055  4/1981  Slaybaugh ..................... 206/232

Primary Examiner—William Price

[57] ABSTRACT

This invention is a box including several sets of index strips, each strip indicated with the name of a different food or non-food item, and snap-on indicators that clip on selected ones of the index strips, to indicate items needed to purchase.

2 Claims, 1 Drawing Sheet

U.S. Patent     May 10, 1988     4,742,911
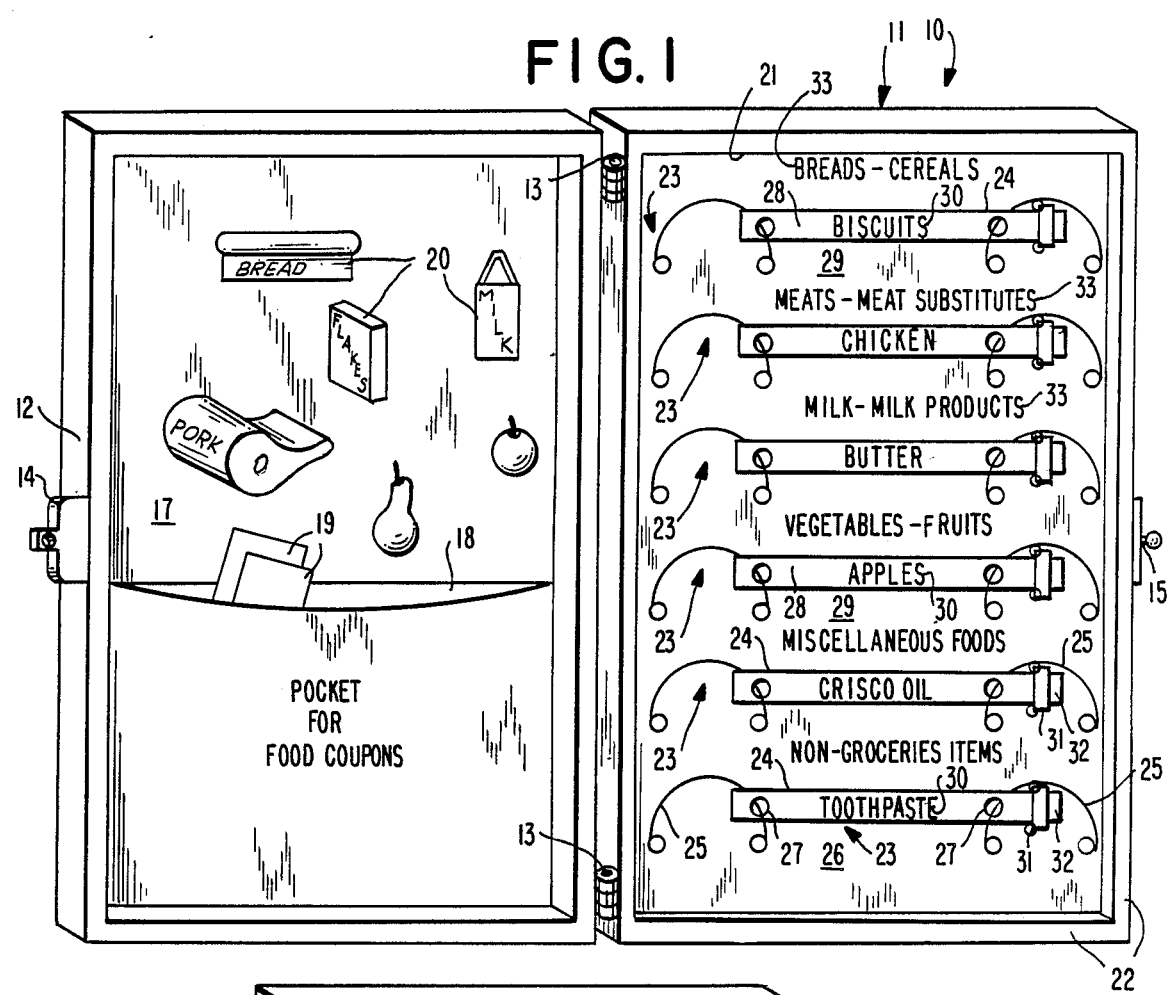
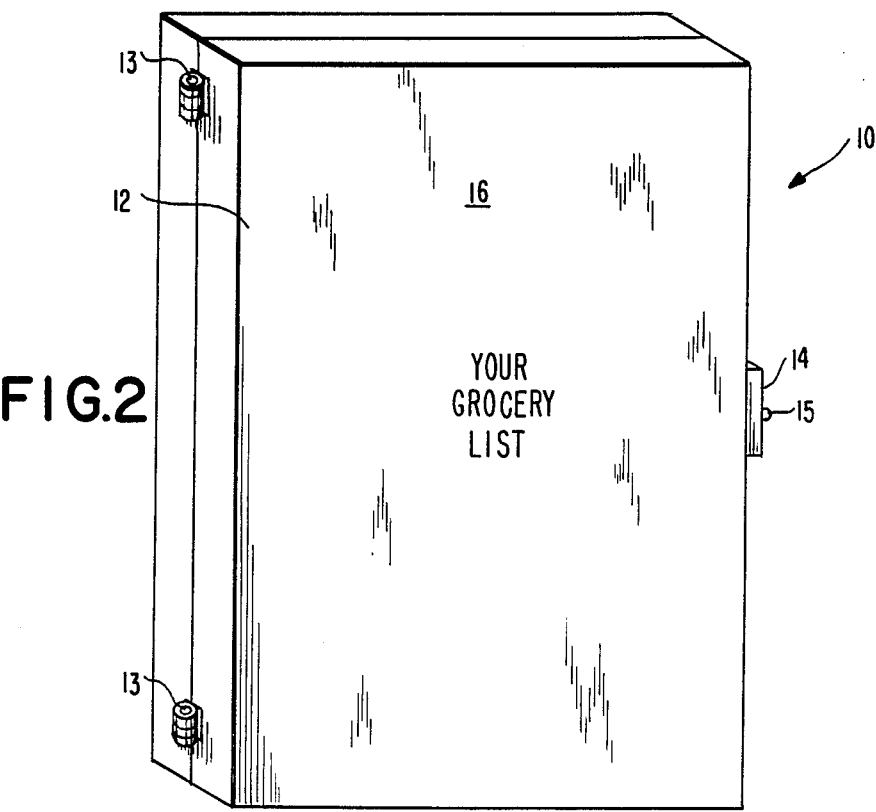

GROCERY LIST DEVICE

BACKGROUND OF THE INVENTION

1. Field of the Invention

This invention relates generally to reminder note pads and the like. More specifically, it relates to shopping list devices.

2. Description of Prior Art

It is well known that when a person goes to shop now-a-days in a supermarket, it is preferable to make out a shopping list before leaving home, so as to be sure that none of the needed food items are forgotten. Otherwise, if depending only on one's memory in a supermarket without a planned list, the sight of all the numerous products confuses the mind, so that it becomes difficult to remember what a person came to buy. So, a written shopping list helps. However, most shopping lists are written out as the items come to a person's mind, so that they are listed with all categories being mixed up. Accordingly, it is not unusual, while going through the different departments of the store, to overlook and forget some items. This situation is, consequently in need of an improvement.

SUMMARY OF THE INVENTION

Therefore, it is a principal object of the present invention to provide a grocery list device, wherein a person, planning to go shopping, lists the needed items by grouping them within specific categories, such as bakery items, meats, produce and the like, so as to not leave out any item.

Another object is to provide a grocery list device, which not only makes it easier to include all items within a specific category when getting into that store department, but also saves time, by not running repeatedly back and forth between the departments.

Another object is to provide a grocery list device, which eliminates need of a pencil to cross out items, such as on a conventional shopping list, while in the store.

Yet a further object is to provide a grocery list device, which includes storage space for food coupons and the like.

Other objects are to provide a grocery list device, which is simple in design, inexpensive to manufacture, rugged in construction, easy to use, and efficient in operation.

These, and other objects, will be readily evident, upon a study of the following Specification and the accompanying Drawing.

BRIEF DESCRIPTION OF THE DRAWINGS

FIG. 1 is an open perspective view of a grocery list box, shown in accordance with the present invention, and FIG. 2 is a front perspective view of the invention, in the closed position.

DETAILED DESCRIPTION

Referring now to the Drawing in greater detail, the reference numeral 10 represents a grocery list device, incorporating the invention, wherein there is a shallow box 11, having a pivoted cover 12 on top attached on hinges 13, and being secured in closed position by means of latch 14, that locks on a pin 15. The box and cover may be made rectangular in shape, as suggested in the Drawing, and the entire device is made of a size which can be conveniently carried in a purse or pocket, when taken along on a shopping trip to the store.

The outer side 16 of the cover is imprinted with the invention name "Your Grocery List". The inner side 17 of the cover has a pocket 18 secured thereto, so that grocery coupons 19, torn out of newspapers, savings stamps or the like, may be carried therewithin. A group of pictures 20, printed also on the inner side of the cover, illustrates different grocery food items.

The box includes a rectangular, shallow, central depression 21, surrounded by low side walls 22. A set of six simple record-keeping mechanisms 23 are located in a row within the depression. Each one of these mechanisms includes a set of index strips 24, that may be flipped around a pair of arched semi-circular rings 25, that are rigidly mounted and removeable as well, at their ends, on the floor 26 of the box, in order to stand upright. The index strips are made of any stiff, flat material, such as paper, plastic or the like, being rectangular in shape, and having a hole 27 near each opposite end, for being mounted on the two rings 25. The flat plane of the two rings are parallel to each other, so as to permit each index strip to travel between opposite ends of each ring, when flipped over between locations 28 and 29. The name 30 of a grocery or nongrocery item is marked on the front side of each index strip. One or a plurality of snap-on indicators 31 are stored adjacent one end of the index strips; the indicator including a tab 32, that can be bent over to snap on a strip end. The indicators are used as reminders to a consumer, as to which grocery or nongrocery item to purchase, in the event that twenty or more index strips are in any one mechanism set, thereby eliminating the need of the customer flipping each index strip individually separate, to find the one labelled with the item that is desired to purchase.

Above each mechanism 23, there is printed the name 33 of the food or non-food category of items handled by the mechanism.

In operative use of the invention, a person makes out a shopping list at home, before going to the store. With the opened-up box lying flat down on a table, the index strips are flipped over from location 28 to 29, and the indicators are snapped on the items needed to purchase. Then, in the store, the index strips are simply flipped from one indicator-attached index strip to the next, as the selected items are loaded into a shopping cart.

While various changes may be made in the detail construction, it is understood that such changes will be within the spirit and scope of the present invention, as is defined by the appended claims.

What I now claim is:

1. A grocery list device, comprising, in combination, a shallow box, a hinged cover on a top thereof for selectively enclosing an interior thereof, a pocket on an inner side of said cover to hold redeemable coupons or stamps, a plurality of record keeping mechanisms inside said box arranged in a row, each said mechanism comprising a set of elongated, flat, stiff strips and a pair of spaced apart, upwardly arched, semi-circular rings mounted at their opposite ends upon a floor of said box, each said strip having a name of a different grocery store purchaseable item printed on one side thereof, and each said strip having an opening near each opposite end thereof for being received on said pair of rings so that when said strip is pivotally flipped over in one direction, said item name faces upwardly so to be seen, and when oppositely flipped, said name faces downwardly so to not be seen.

2. The combination as set forth in claim 1, wherein a reminder indicator is stored adjacent one end of each said strip, said reminder indicator having a bendable tab to snap over or under said strip end.

* * * * *